United States Patent
He et al.

(10) Patent No.: US 10,783,362 B2
(45) Date of Patent: Sep. 22, 2020

(54) METHOD AND APPARATUS FOR RECOGNIZING ILLEGAL BEHAVIOR IN UNATTENDED SCENARIO

(71) Applicant: ALIBABA GROUP HOLDING LIMITED, Grand Cayman (KY)

(72) Inventors: Wujie He, Hangzhou (CN); Xiaodong Zeng, Hangzhou (CN); Xiaobo Zhang, Hangzhou (CN)

(73) Assignee: ALIBABA GROUP HOLDING LIMITED, Grand Cayman (KY)

( * ) Notice: Subject to any disclaimer, the term of this patent is extended or adjusted under 35 U.S.C. 154(b) by 0 days.

(21) Appl. No.: 16/796,616

(22) Filed: Feb. 20, 2020

(65) Prior Publication Data

US 2020/0193149 A1 Jun. 18, 2020

Related U.S. Application Data

(63) Continuation of application No. PCT/CN2018/100977, filed on Aug. 17, 2018.

(30) Foreign Application Priority Data

Nov. 3, 2017 (CN) .......................... 2017 1 1069063

(51) Int. Cl.
*G06K 9/00* (2006.01)
*G06K 9/62* (2006.01)
(Continued)

(52) U.S. Cl.
CPC ..... *G06K 9/00335* (2013.01); *G06K 9/00261* (2013.01); *G06K 9/52* (2013.01);
(Continued)

(58) Field of Classification Search
None
See application file for complete search history.

(56) References Cited

U.S. PATENT DOCUMENTS

| 7,639,840 B2 | 12/2009 | Hanna et al. |
| 7,671,741 B2 | 3/2010 | Lax et al. |
| (Continued) |

FOREIGN PATENT DOCUMENTS

| CN | 101571982 A | 11/2009 |
| CN | 102224526 A | 10/2011 |
| (Continued) |

OTHER PUBLICATIONS

Thomaz et al "A Practical Approach for Recognizing Eating Moments with Wrist-Mounted Inertial Sensing", Proc ACM Int Conf Ubiquitous Comput. Sep. 2015 ; 2015 (Year: 2015).*

(Continued)

*Primary Examiner* — Randolph I Chu

(57) ABSTRACT

Methods, apparatuses, and devices, including computer programs encoded on computer storage media, for recognizing an unauthorized behavior are provided. One of the methods includes: obtaining, through machine vision, body movement pattern data of a user; obtaining feature data of an object; comparing the body movement pattern data with a preset body movement pattern; and determining that the user's behavior is unauthorized in response to the body movement pattern data matching the preset body movement pattern and that: a distance between the user's body and the object is within a distance threshold over a preset length of time, the attribute category of the object is a preset category, and the external surface image data does not match a default external surface image of the object. The feature data may include: position data of the object based on a radio frequency identification tag on the object, attribute category data of the object, and external surface image data of the object.

19 Claims, 3 Drawing Sheets

(51) Int. Cl.
*G06K 9/52* (2006.01)
*G06K 19/07* (2006.01)

(52) U.S. Cl.
CPC ....... *G06K 9/6215* (2013.01); *G06K 19/0723* (2013.01); *G06K 2209/21* (2013.01)

(56) References Cited

U.S. PATENT DOCUMENTS

| | | | |
|---|---|---|---|
| 7,920,063 | B2 | 4/2011 | Ulrich |
| 9,544,551 | B2 | 1/2017 | Locke et al. |
| 2005/0011959 | A1 | 1/2005 | Grosvenor |
| 2008/0298687 | A1 | 12/2008 | Lai et al. |
| 2009/0016599 | A1 | 1/2009 | Eaton et al. |
| 2014/0180757 | A1 | 6/2014 | Argue et al. |
| 2014/0222501 | A1 | 8/2014 | Hirakawa et al. |
| 2015/0012396 | A1 | 1/2015 | Puerini et al. |
| 2015/0379238 | A1* | 12/2015 | Connor ............... G06F 19/3475 702/19 |

FOREIGN PATENT DOCUMENTS

| | | | |
|---|---|---|---|
| CN | 102881100 | * | 1/2013 |
| CN | 102881100 | A | 1/2013 |
| CN | 106204240 | A | 12/2016 |
| CN | 106778179 | A | 5/2017 |
| CN | 106981150 | A | 7/2017 |
| CN | 108021865 | A | 5/2018 |
| EP | 1632919 | A2 | 3/2006 |
| JP | 2009048430 | A | 3/2009 |
| TW | 200525449 | A | 8/2005 |
| TW | 200533147 | A | 10/2005 |
| TW | 200837644 | A | 9/2008 |
| WO | 2008157113 | A2 | 12/2008 |
| WO | 2010036091 | A2 | 4/2010 |
| WO | 2014209724 | A1 | 12/2014 |

OTHER PUBLICATIONS

Sattel (Amazon Go & RFID—The Automation Dilama), https://www.autodesk.com/products/eagle/blog/amazon-go-rfid-automation-dilemma/, May 30, 2017 (Year: 2017).*
Kim et al. ("An Analysis of Eating Activities for Automatic Food Type Recognition"), International Journal of Control Automation and Systems • Oct. 2010 (Year: 2010).*
First Search Report for Chinese Application No. 201711069063.2, dated Mar. 18, 2019, 1 page.
First Office Action for Chinese Application No. 201711069063.2 dated Apr. 2, 2019, 14 pages.
Supplementary Search Report for Chinese Application No. 201711069063.2 dated Dec. 27, 2019, 1 page.
First Search Report for Taiwanese Application No. 107130832, dated Jun. 27, 2019, 1 page.
International Search Report and Written Opinion of the International Searching Authority for International Application PCT/CN2018/100977, dated Sep. 26, 2018, with partial machine English translation, 9 pages.
International Preliminary Report on Patentability Chapter I for PCT Application No. PCT/CN2018/100977 dated May 14, 2020.

* cited by examiner

METHOD AND APPARATUS FOR RECOGNIZING ILLEGAL BEHAVIOR IN UNATTENDED SCENARIO

CROSS-REFERENCE TO RELATED APPLICATIONS

The present application is a continuation application of International Application No. PCT/CN2018/100977, filed on Aug. 17, 2018, which claims priority and the benefit of the Chinese Patent Application No. 201711069063.2 filed with China National Intellectual Property Administration (CNIPA) of the People's Republic of China on Nov. 3, 2017. The entire contents of the above-recognized applications are incorporated herein by reference.

TECHNICAL FIELD

This specification relates to the field of Internet technology, and in particular, to a method and apparatus for recognizing an unauthorized behavior in an unattended scene.

BACKGROUND

With the development of science and technology, more and more unattended scenes are seen in daily life, such as unmanned supermarkets, unmanned gyms, and unmanned KTV. However, without human supervision, an unattended scene may also be subjected to some unauthorized behaviors, such as leaving without payment after eating or drinking in unmanned supermarkets, damaging fitness facilities in unmanned gyms, etc. Therefore, an effective solution for recognizing unauthorized behaviors needs to be provided in unattended scenes.

SUMMARY

This specification discloses a method and apparatus for recognizing an unauthorized behavior in, for example, an unattended scene.

In one aspect, this specification provides a method for recognizing an unauthorized behavior, comprising: obtaining, through machine vision, body movement pattern data of a user; obtaining feature data of an object; comparing the body movement pattern data with a preset body movement pattern; and determining that the user's behavior is unauthorized in response to the body movement pattern data matching the preset body movement pattern and that: a distance between the user's body and the object is within a distance threshold over a preset length of time, the attribute category of the object is a preset category, and the external surface image data does not match a default external surface image of the object. The feature data may include: position data of the object based on a radio frequency identification tag on the object, attribute category data of the object, and external surface image data of the object.

In another aspect, the specification provides an apparatus for recognizing an unauthorized behavior, comprising: a first acquisition unit, configured to obtain body data of a user; a second acquisition unit, configured to obtain feature data of an object; and a behavior recognition unit configured to determine whether the user performs an unauthorized behavior according to the body data and the feature data of the object.

In yet another aspect, the specification also provides a device for recognizing an unauthorized behavior. The device may include one or more processors and a non-transitory computer-readable memory coupled to the one or more processors and configured with instructions executable by the one or more processors to perform operations. The operations may include: obtaining body data of a user; obtaining feature data of an object in the unattended scene; comparing the body data with a preset body movement pattern; and in response to the body data matching the preset body movement pattern, determining the unauthorized behavior of the user based on the body data and the feature data.

In still another aspect, the specification further provides a non-transitory computer-readable storage medium for recognizing an unauthorized behavior. The non-transitory computer-readable storage medium may store instructions executable by one or more processors to cause the one or more processors to perform operations. The operations may include: obtaining body data of a user; obtaining feature data of an object; comparing the body data with a preset body movement pattern; and in response to the body data matching the preset body movement pattern, determining the unauthorized behavior of the user based on the body data and the feature data.

In a further aspect, the specification may also provide another method for recognizing an unauthorized behavior, comprising: obtaining body data of a user; obtaining feature data of an object in the unattended scene; determining, according to a behavior recognition model, the unauthorized behavior of the user based on the body data and the feature data with a preset body movement pattern. The behavior recognition model may be trained with results of recognizing unauthorized behaviors.

Another method for recognizing an unauthorized behavior is also provided the specification. The method may include: obtaining, through machine vision, body data of a user; obtaining feature data of an object; comparing the body data with a preset body movement pattern; and in response to the body data matching the preset body movement pattern and the feature data meeting preset conditions, determining the unauthorized behavior of the user based on the body data and the feature data.

In this specification, the body data of the user and the feature data of the object, in unattended scenes, can be obtained, and actual conditions of the user and the object are combined to determine an unauthorized behavior, thereby achieving effective recognition of the unauthorized behavior in the unattended scene.

DETAILED DESCRIPTION

Figure 1:
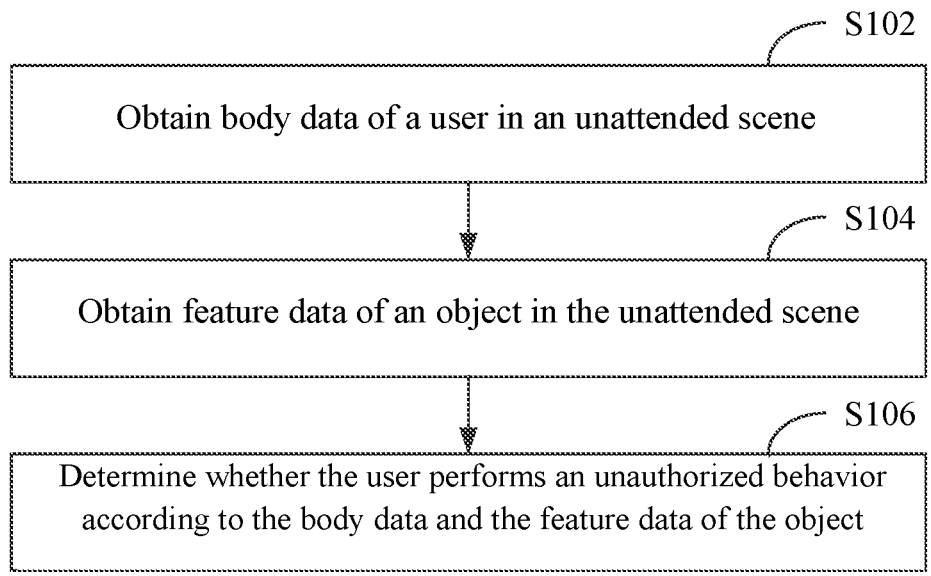
FIG. 1 is a flow chart of a method for recognizing an unauthorized behavior in an unattended scene according to an exemplary embodiment of this specification.

Exemplary embodiments are described in detail herein, examples of which are illustrated in the drawings. When the following description involves drawings, the same numbers in different drawings represent the same or similar elements unless otherwise indicated. The implementation manners described in the following exemplary embodiments do not represent all implementation manners consistent with this specification. Conversely, they are merely examples of apparatuses and methods consistent with some aspects of this specification, as detailed in the attached claims.

Terms used in this specification are only aimed at describing specific embodiments rather than limiting this specification. In this specification and the claims, the singular forms "a," "an," and "the" are intended to indicate the plural forms as well, unless the context clearly indicates otherwise. It should also be understood that the term "and/or" used herein refers to and includes any or all possible combinations of one or more associated listed items.

It should be understood that although terms such as first, second, and third may be used in this specification to describe various information, the information should not be limited thereto. These terms are only used to distinguish one another for information of the same type. For example, without departing from the scope of this specification, first information may also be referred to as second information; and similarly, second information may also be referred to as first information. Depending on the context, the word "if" used herein can be interpreted as "at the time of," "when," or "in response to determination."

FIG. 1 is a schematic flow chart of a method for recognizing an unauthorized behavior in an unattended scene according to an exemplary embodiment of this specification.

The method for recognizing an unauthorized behavior in an unattended scene can be applied to a front-end recognition device in an unattended scene, such as an recognition device with a processing function deployed in an unattended scene. The recognition method may also be applied to a back-end device for recognition in an unattended scene, such as a back-end recognition device, which is not limited by this specification.

In FIG. 1, the method for recognizing an unauthorized behavior in an unattended scene may include the following steps.

In step 102, the method may include obtaining body data of a user in an unattended scene.

In some embodiments, the acquisition of the body data may be started after the user enters the unattended scene. The user may refer to a person who uses the unattended scene. The body data may include body behavior data and body position data of the user; and the body of the user may include: limbs, mouth, and other parts. In some embodiments, the body data of the user in the unattended scene may be obtained by using a machine vision technology. The body data may also be obtained by using other technologies, which is not limited by this specification.

In step 104, the method may include obtaining feature data of an object in the unattended scene.

In one embodiment, the acquisition of the feature data may also be started after the user enters the unattended scene. Here, the object may be an object in an unattended scene, such as goods in an unmanned supermarket, a cabinet in which the goods are placed in the unmanned supermarket, or fitness equipment in an unmanned gym.

The feature data may include: position data of the object, external surface image data of the object, vibration data obtained by a sensor placed in the object, and the like. In some embodiments, the feature data of the object in the unattended scene may be obtained by using a machine vision technology. The feature data may also be obtained by other means such as a sensor, which is not limited by this specification.

In step 106, the method may include determining whether the user performs an unauthorized behavior according to the body data and the feature data of the object.

In some embodiments, the obtained body data and the feature data may be analyzed to determine whether the user in the unattended scene performs an unauthorized behavior, such as damaging goods.

In some embodiments, the obtained body data can be compared with a preset body movement pattern. The preset body movement pattern may include a preset mouth movement pattern and/or a preset limb movement pattern. When the body data of the user is determined as matching the preset body movement pattern, whether the user performs the unauthorized behavior may be further determined based on the body data of the user and the feature data of the object.

The body data of the user and the feature data of the object in the unattended scene can be obtained, and actual conditions of the user and the object are combined to recognize an unauthorized behavior, thereby achieving effective recognition of the unauthorized behavior in the unattended scene.

Detailed description of this method will be provided below by using an unmanned supermarket as the unattended scene. The unauthorized behavior may be unauthorized eating or drinking or damaging a cabinet.

In the unmanned supermarket scene, after a user (e.g., a customer of the unmanned supermarket) enters the unmanned supermarket, the acquisition of body data of the user and feature data of an object may be started to determine whether the user performs an unauthorized behavior, and can be ended after the user leaves the unmanned supermarket.

There may be several methods for determining whether the user enters or leaves the unmanned supermarket. In one embodiment, when a user triggers opening of a door of the unmanned supermarket from the outside, the user can be determined to enter the unmanned supermarket; when the user triggers opening of a door of the unmanned supermarket from the inside, the user can be determined to leave the unmanned supermarket. In another embodiment, when a recognition apparatus in the unmanned supermarket recognizes a living person, the user may be determined as having entered the unmanned supermarket; when the recognition apparatus in the unmanned supermarket cannot recognize a living person, the user can be determined as having left the unmanned supermarket.

With respect to solutions for triggering opening of the door of the unmanned supermarket and recognizing a living person by the recognition apparatus as described above, references may be made to related technologies, which are not elaborated in detail in this specification. In addition to the above-described solutions, other methods may further be used to determine whether the user enters or leaves the unmanned supermarket, which is not limited by this specification.

I. Unauthorized Eating or Drinking as the Unauthorized Behavior.

Figure 2:
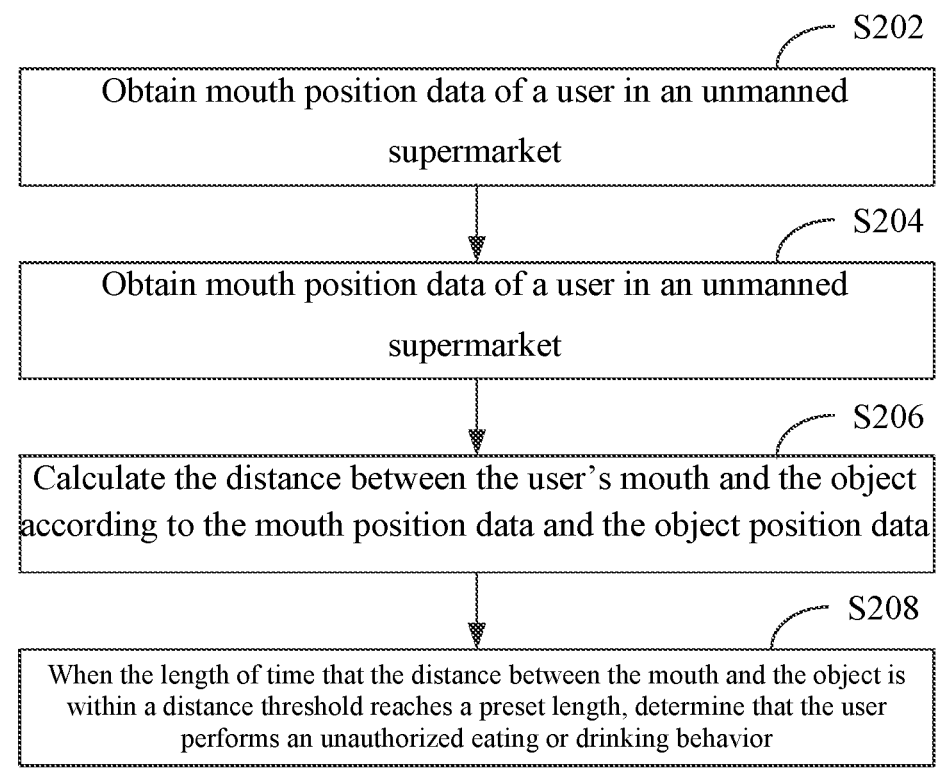
FIG. 2 is a flow chart of another method for recognizing an unauthorized behavior in an unattended scene according to an exemplary embodiment of this specification.

In the unmanned supermarket scene, a user may eat or drink in the supermarket after entering thereinto, and leaves without payment, causing economic losses to the unmanned supermarket. As shown in FIG. 2, the method for recognizing an unauthorized eating or drinking behavior may include the following steps.

In step 202, the method may include obtaining mouth position data of the user in the unmanned supermarket.

In this embodiment, face features of the user may be obtained first, and the user's mouth is then recognized, and mouth position data of the user is further obtained. For example, after the mouth of the user is recognized, the mouth position data of the user can be calculated according to the relative position between the user's mouth and an acquisition apparatus. In other embodiments, the mouth position data of the user may alternatively be obtained by other means, which is not limited by this embodiment.

In some embodiments, the mouth position data may include longitudinal and latitudinal data of the mouth. In some embodiments, the mouth position data may be relative position data of the mouth in the unmanned supermarket. For example, a spatial point in the unmanned supermarket (for example, the foot of a wall of the unmanned supermarket) can be used as an origin to establish a spatial orthogonal coordinate system, and then coordinates of the user's mouth in the spatial orthogonal coordinate system can be used as the mouth position data, which is not limited by this specification.

In step 204, the method may include obtaining position data of an object in the unmanned supermarket.

In some embodiments, the object may refer to goods to be sold in the unmanned supermarket. In some embodiments, a Radio Frequency Identification (RFID) tag can be placed on the goods, and the position data of the goods can be determined by the RFID positioning technology. In some other embodiments, the position data of the goods can be determined by using other positioning technologies, which is not limited by this specification.

Since there are usually plenty of goods for sale in the unmanned supermarket, in some embodiments, an initial position of each piece of goods can be stored in advance. For example, the positions of the goods on a shelf can be used as the initial positions. When the position of a certain piece of goods is determined to be not the initial position, the subsequent steps of this embodiment can be performed.

Similar to the mouth position data of the user, the object position data may be longitudinal and latitudinal data, or relative position data of the object in the unmanned supermarket, which is not limited by this embodiment.

In step 206, the method may include calculating a distance between the user's mouth and the object according to the mouth position data and the object position data.

In one embodiment, when the distance between the user's mouth and the object is calculated, the mouth position data and the object position data obtained at the same time point are usually used to ensure the accuracy of the above-described distance.

In step 208, the method may include determining, when a length of time that the distance between the mouth and the object is within a distance threshold reaches a preset length of time, that the user performs an unauthorized eating or drinking behavior.

In some embodiments, the distance threshold may be preset, such as 20 cm or 30 cm. When the distance between the user's mouth and the goods is within the distance threshold, the distance between the user's mouth and the goods may be short, and the user may be smelling the goods or unauthorizedly eating or drinking the goods.

If the user wants to smell the goods, the length of time that the distance between the user's mouth and the goods is within the distance threshold may be shorter; and if the user is eating or drinking the goods unauthorizedly, the length of time that the distance between the user's mouth and the goods is within the distance threshold may be longer. Therefore, the length of time that the distance between the user's mouth and the goods is within the distance threshold can be determined. When the length of time reaches a preset length of time, the user is determined to be eating or drinking unauthorizedly. In other words, the user performs an unauthorized eating or drinking behavior. In some embodiments, the preset length of time may also be set in advance, such as 5 s or 10 s.

In some embodiments, when the length of time that the distance between the user's mouth and the goods is within the preset distance threshold in an unattended scene reaches the preset length, the user can be determined as performing an unauthorized eating or drinking behavior, thereby achieving the recognition of the unauthorized eating or drinking behavior in the unattended scene.

In some other embodiments, in order to avoid misrecognition and to improve accuracy in recognizing an unauthorized eating or drinking behavior, mouth behavior data of the user may also be obtained as the body data of the user; and compared with a preset mouth movement pattern (such as a chewing pattern or a swallowing pattern).

If the obtained mouth behavior data matches the preset mouth movement pattern, and the length of time that the distance between the user's mouth and the goods is within a distance threshold reaches a preset length, the user may be determined as eating or drinking unauthorizedly, i.e., the user performs an unauthorized eating or drinking behavior. If the obtained mouth behavior data does not match the preset mouth movement pattern, the user may be determined as not performing an unauthorized eating or drinking behavior.

Whether the mouth behavior data of the user matches the preset mouth movement pattern may be determined before or after step 206 shown in FIG. 2, or may be determined while step 206 is performed, which is not limited by this embodiment.

In some embodiments, in order to avoid misrecognition and to improve the accuracy in recognizing an unauthorized eating or drinking behavior, attribute category data may further be obtained as the feature data of the goods. The attribute category data may refer to classification of the goods, such as edible and inedible. The attribute category of the object may be a preset category. If the user eats or drinks unauthorizedly in the unmanned supermarket, the goods selected by the user must be in the edible category. Therefore, when the length of time that the distance between the user's mouth and the goods is within a distance threshold reaches a preset length and an attribute category of the goods falls in the edible category, the user can be determined as eating or drinking unauthorizedly. For example, if the attribute category of the goods is bottled drinking water, and the length of time that the distance between the user and the bottled drinking water is within a distance threshold reaches a preset length, the user can be considered as drinking the bottled drinking water unauthorizedly.

If the length of time that the distance between the user's mouth and the goods is within a distance threshold reaches a preset length but the attribute category of the goods does not fall in the edible category, the user may not be determined as eating or drinking unauthorizedly. For example, when the attribute category of the goods is a household commodity and the length of time that the distance between the user and the household commodity is within a distance threshold reaches a preset length, the user may not be determined as performing an unauthorized eating or drinking behavior.

The attribute category of the goods can be determined before or after step 206 shown in FIG. 2, or may be determined while step 206 is performed, which is not limited by this specification.

In some embodiments, in order to avoid misrecognition and to improve the accuracy in recognizing an unauthorized eating or drinking behavior, external surface image data of the goods may further be obtained as the feature data of the goods. In some embodiments, the external surface image data may refer to an external package image of the goods.

Some edible goods in the unmanned supermarket can only be eaten after unpacking. Thus, a user's unauthorized eating or drinking behavior may be recognized by determining whether the external surface image data of the goods matches a default external surface image. In some embodiments, the default external surface image can be stored in advance, and the external surface image data of the goods can be compared with the default external surface image. If the external surface image data of the goods matches the default external surface image, the external package of the goods may be not damaged; and if the external surface image data of the goods does not match the default external surface image, the external package of the goods may be damaged. For example, when the length of time that the distance between the user's mouth and the goods is within a distance threshold reaches a preset length and the external package of the goods is damaged, the user may be determined as performing an unauthorized behavior.

The external surface image data of the goods can be matched before or after step 206 shown in FIG. 2, or may be matched while step 206 is performed, which is not limited by this specification.

In some embodiments, the above-described solutions may be combined, or other recognition solutions may be adopted to recognize an unauthorized eating or drinking behavior, which is not limited by this specification.

II. Damaging a Cabinet as the Unauthorized Behavior.

In the unmanned supermarket scene, after entering the unmanned supermarket, the user may damage the goods or other objects in the unmanned supermarket. For example, the user may kick a cabinet, causing losses to the unmanned supermarket.

Figure 3:
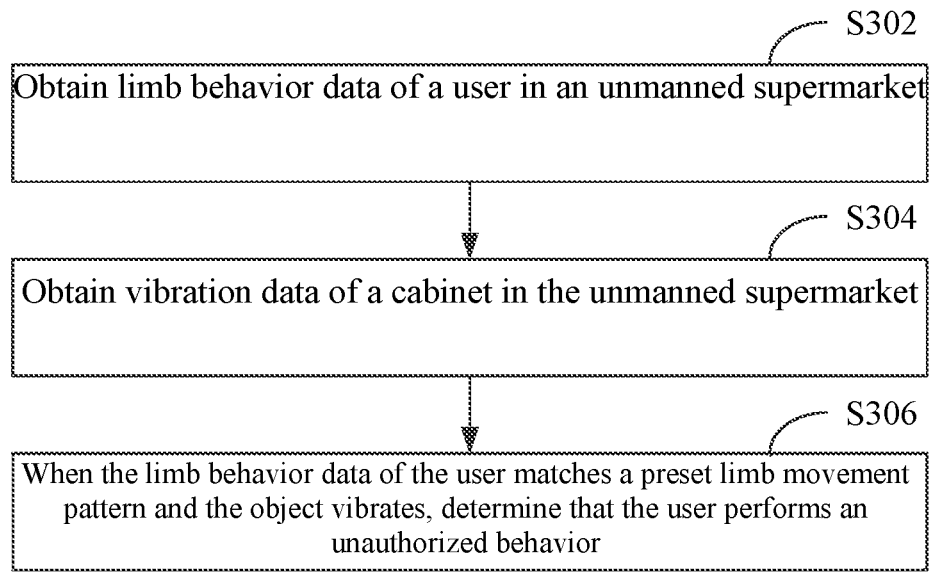
FIG. 3 is a flow chart of another method for recognizing an unauthorized behavior in an unattended scene according to an exemplary embodiment of this specification.

FIG. 3 illustrates an exemplary recognition method for the unauthorized behavior of damaging a cabinet, and the method may include the following steps.

In step 302, the method may include obtaining limb behavior data of the user in the unmanned supermarket.

In this embodiment, the limb behavior data may include arm behavior data, leg behavior data, and the like. The limb behavior data of the user may be obtained over a period of time for analyzing the user's limb movement.

In step 304, the method may include obtaining vibration data of the cabinet in the unmanned supermarket.

In some embodiments, a sensor such as a gyroscope sensor or an acceleration sensor may be placed on an object (e.g. a cabinet) in the unmanned supermarket to obtain the vibration data of the cabinet. In some other embodiments, no sensors are placed on the object, and the vibration data of the cabinet may be obtained alternatively by using other technologies such as a machine vision technology. Whether the cabinet vibrates can be determined based on the obtained vibration data.

In step 306, the method may include determining, when the limb behavior data of the user matches a preset limb movement pattern and the cabinet vibrates, that the user performs an unauthorized behavior.

Based on step 302, after the limb behavior data of the user is obtained, the limb behavior data can be compared with a preset limb movement pattern. Whether the limb behavior data matches the preset limb movement pattern, such as a "smashing" pattern, a "kicking" pattern, or a "stepping on" pattern, can be determined. If the limb behavior data matches the preset disruptive limb movement pattern, the user may be damaging goods in the unmanned supermarket, and the recognition of the unauthorized behavior may be continued. If the limb behavior data does not match the preset limb movement pattern, the user may be determined as not performing an unauthorized behavior of damaging goods in the unmanned supermarket.

Based on step 304, after the vibration data of the cabinet is obtained, a vibration state of the object, i.e., whether the cabinet vibrates, can be determined according to the vibration data. If the cabinet vibrates and the limb behavior data of the user matches the above-described preset limb movement pattern, the user can be determined as performing an unauthorized behavior of damaging the cabinet. If the cabinet does not vibrate, the user may be determined as not performing an unauthorized behavior of damaging the cabinet.

When the limb behavior data of the user in the unattended scene matches the preset disruptive limb movement pattern and the object vibrates, the user can be determined as performing an unauthorized behavior of damaging an object, thereby achieving the recognition of the unauthorized disruptive behavior in the unattended scene.

In some embodiments, during the recognition of an unauthorized damaging behavior, the distance between the object and the user's limb that matches the limb movement pattern may further be calculated. If the distance is within a preset range, for example, the distance is short, the user may be determined as performing an unauthorized behavior of damaging the object.

In some embodiments, the user may damage goods to be sold in the unmanned supermarket other than the object that are not for sale, e.g. a cabinet. For example, the user may tear the external package of the goods. Therefore, during the recognition of an unauthorized disruptive behavior, external surface image data of the object may further be obtained; and whether the obtained external surface image data matches a default external surface image of the object may be used to determine whether the external package of the object is damaged.

External surface image data of objects that are not for sale, for example, cabinets in the unmanned supermarket, fitness equipment in the unmanned gym and other objects, may also be obtained and matched with default external surface images, which is not limited by this specification. However, as objects such as cabinets and fitness equipment are usually sturdy, external surface images of the objects may not change even if the objects are damaged by the user. In order to improve the accuracy of recognition, other data further can be obtained for recognition.

In some embodiments, the above-described recognition solutions can be combined to recognize whether the user performs an unauthorized disruptive behavior or other recognition solutions can be adopted, which is not limited by this specification.

In some embodiments, developers of the recognition solutions may establish a corresponding behavior recognition model first, and then improve the behavior recognition model through continuous training. In some embodiments, the unauthorized behavior of the user can be determined, according to the behavior recognition model, based on the body data and the feature data. In some embodiments, the unauthorized behavior of the user can be determined, according to the behavior recognition model, with a preset body movement pattern. The behavior recognition model can be trained with previous results of recognizing unauthorized behaviors in unattended scenes. Before the behavior recognition model is perfect, if the user's unauthorized behavior cannot be determined according to the body data of the user and the feature data of the object, a determination request may be output to relevant personnel. The personnel can make a determination manually and return a result of determination to improve the behavior recognition model. In some embodiments, when the user's unauthorized behavior cannot be determined according to the body data of the user and the feature data of the object, the acquisition and recognition of the body data and feature data may be continued. If the unauthorized behavior still cannot be determined after a certain period of time, a determination request may also be output to the relevant personnel to request a manual intervention.

After the unauthorized behavior of the user is recognized, the user may be warned or penalized for the unauthorized behavior in different ways.

In one embodiment, when the user performs an unauthorized behavior, the user can be subjected to a credit penalty. For example, before entering the unattended scene, the user can undergo identity authentication, such as scanning a QR code before entering the unmanned supermarket to allow the unmanned supermarket to obtain the user's account information. If the user performs an unauthorized behavior, the credit information of his account can be updated in a negative direction. For example, a credit rating of the user is lowered.

In another embodiment, if the user performs an unauthorized behavior, the unauthorized behavior may be reported in the unattended scene. For example, the unauthorized behavior of the user may be reported in audio form or may be played back in video form as a warning.

In another embodiment, if the user performs an unauthorized behavior, an amount of resources corresponding to the object targeted by the unauthorized behavior may be added to the user's bill. The amount of resources may refer to the value of the object. For example, if the user unauthorizedly eats potato chips in the unmanned supermarket, the cost of the potato chips can be added to the user's bill. The user will still be charged for the corresponding fees even if the user discards the package in the unmanned supermarket after eating the potato chips. If the user damages a cabinet in the unmanned supermarket, a fine corresponding to the behavior of damaging the cabinet can be added to the user's bill to achieve the purpose of penalizing the user.

When the user performs an unauthorized behavior, the user may be penalized in other ways (for example, the unauthorized behavior of the user is made public in the industry), which is not limited by this specification.

Corresponding to the above-described embodiments of the method for recognizing an unauthorized behavior in an unattended scene, this specification further provides an apparatus for recognizing an unauthorized behavior in an unattended scene.

Figure 4:
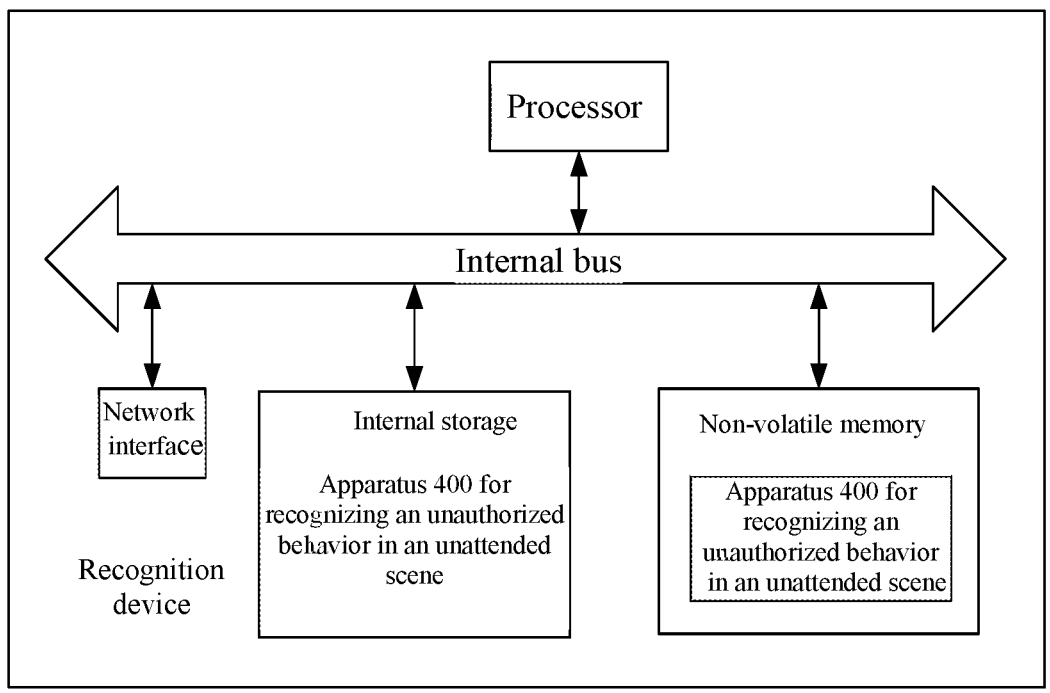
FIG. 4 is a schematic structural diagram of an apparatus for recognizing an unauthorized behavior according to an exemplary embodiment of this specification.

The embodiments of the apparatus for recognizing an unauthorized behavior in an unattended scene in this specification can be applied to a recognition device. The apparatus embodiment may be achieved by software, hardware, or a combination thereof. Using software to achieve the apparatus embodiment as an example, the apparatus may execute a corresponding computer program instruction in a non-volatile memory, by a processor in the recognition device in which the apparatus is located, into an internal storage. In terms of hardware, FIG. 4 is a hardware structural diagram of a recognition device in which the apparatus for recognizing an unauthorized behavior in an unattended scene is located. In addition to a processor, an internal storage, a network interface, and a non-volatile memory shown in FIG. 4. In some embodiments, the recognition device in which the apparatus of this embodiment is located may further include other hardware according to actual functions of the recognition device. Details are not described herein.

Figure 5:
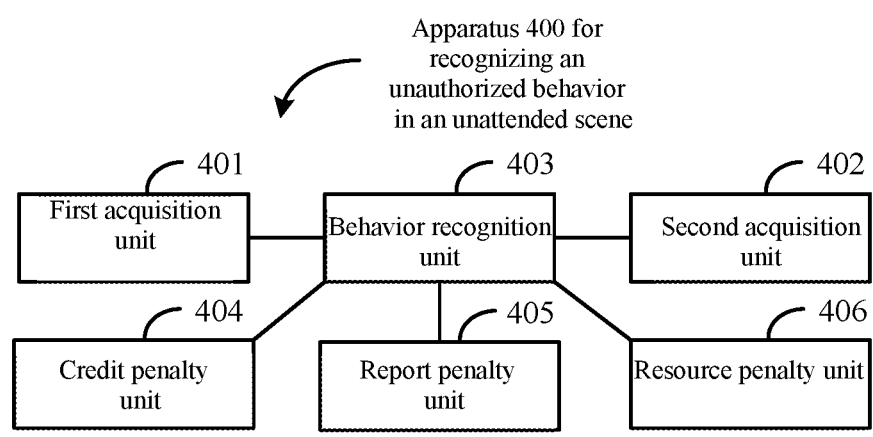
FIG. 5 is a block diagram of an apparatus for recognizing an unauthorized behavior according to an exemplary embodiment of this specification.

FIG. 5 is a block diagram of an apparatus for recognizing an unauthorized behavior in an unattended scene according to an exemplary embodiment of this specification. The apparatus 400 for recognizing an unauthorized behavior in an unattended scene can be applied to the above-described recognition device shown in FIG. 4, and includes a first acquisition unit 401, a second acquisition unit 402, a behavior recognition unit 403, a credit penalty unit 404, a report penalty unit 405, and a resource penalty unit 406.

The first acquisition unit 401 is configured to obtain body data of a user in an unattended scene. The second acquisition unit 402 is configured to obtain feature data of an object in the unattended scene. The behavior recognition unit 403 is configured to determine, according to the body data and the feature data of the object, whether the user performs an unauthorized behavior.

In some embodiments, the body data includes mouth position data of the user; and the feature data includes object position data of the object. The behavior recognition unit 403 may be configured to calculate the distance between the user's mouth and the object according to the mouth position data and the object position data. When the length of time that the distance between the mouth and the object is within a distance threshold reaches a preset length, determines that the user performs an unauthorized behavior.

In some embodiments, the body data may further include mouth behavior data of the user. When the length of time that the distance between the mouth and the object is within a distance threshold reaches a preset length and the mouth behavior data of the user matches a preset mouth movement pattern, the behavior recognition unit 403 is configured to determine that the user performs an unauthorized behavior.

In some embodiments, the feature data further includes attribute category data of the object. When the length of time that the distance between the mouth and the object is within a distance threshold reaches a preset length and the attribute category of the object falls in the edible category, the behavior recognition unit 403 is configured to determine that the user performs an unauthorized behavior.

In some embodiments, the feature data further includes external surface image data of the object. When the length of time that the distance between the mouth and the object is within a distance threshold reaches a preset length and the external surface image of the object does not match a default external surface image, the behavior recognition unit 403 is configured to determine that the user performs an unauthorized behavior.

In some embodiments, the body data may include limb data of the user; and the feature data may include vibration data of the object. When the limb behavior data of the user matches a preset limb movement pattern and the object vibrates, the behavior recognition unit 403 is configured to determine that the user performs an unauthorized behavior. In some embodiments, the vibration data can be obtained by a sensor placed on the object.

The credit penalty unit 404 is configured to inflict a credit penalty on the user when the user performs an unauthorized behavior. The report penalty unit 405 is configured to report, when the user performs an unauthorized behavior, the unauthorized behavior in the unattended scene. The resource penalty unit 406 is configured to add an amount of resources corresponding to the object to the user's bill when the user performs an unauthorized behavior.

Since the apparatus embodiments correspond to the method embodiments, for relevant portions, reference may be made to the specifications in the method embodiments. The above-described apparatus embodiments are only examples. Units described as separate components may or may not be physically separated, and components displayed as units may or may not be physical units, i.e., may be located at one place or be distributed on multiple network units. Some or all of the modules may be selected according to actual needs to achieve the objectives of the solutions in this specification. A person of ordinary skill in the art can understand and implement the solutions without creative efforts.

Systems, apparatuses, modules, or units described in the above embodiments may be implemented by computer chips or physical objects, or by products with certain functions. A typical type of implementation device is a computer, and a specific form of the computer may be a personal computer, a laptop computer, a mobile phone, a camera phone, a smart phone, a personal digital assistant, a media player, a navigation device, an email sending and receiving device, a game console, a tablet computer, a wearable device, or a combination of any of these devices.

Corresponding to the method for recognizing an unauthorized behavior in an unattended scene, this specification further provides a device for recognizing an unauthorized behavior in an unattended scene. The device for recognizing an unauthorized behavior in an unattended scene includes a processor and a memory for storing a machine-executable instruction. Here, the processor and the memory are usually connected to each other through an internal bus. In some embodiments, the device may further include an external interface to enable communications with other equipment or components.

By executing the machine-executable instruction for recognizing an unauthorized behavior in an unattended scene stored in the memory, the processor is configured to: obtain body data of a user in an unattended scene; obtain feature data of an object in the unattended scene; and determine whether the user performs an unauthorized behavior according to the body data and the feature data of the object.

In some embodiments, the body data includes mouth position data of the user; and the feature data includes object position data of the object. To determine whether the user performs an unauthorized behavior according to the body data and the feature data of the object, the processor is configured to: calculate the distance between the user's mouth and the object according to the mouth position data and the object position data. When the length of time that the distance between the mouth and the object is within a distance threshold reaches a preset length, the user is determined as performing an unauthorized behavior.

In some embodiments, the body data further includes mouth behavior data of the user. To determine whether the user performs an unauthorized behavior according to the body data and the feature data of the object, the processor is configured to: when the length of time that the distance between the mouth and the object is within a distance threshold reaches a preset length and the mouth behavior data of the user matches a preset mouth movement pattern, determine that the user performs an unauthorized behavior.

In some embodiments, the feature data further includes attribute category data of the object. To determine whether the user performs an unauthorized behavior according to the body data and the feature data of the object, the processor is configured to: when the length of time that the distance between the mouth and the object is within a distance threshold reaches a preset length and the attribute category of the object falls in an edible category, determine that the user performs an unauthorized behavior.

In some embodiments, the feature data further includes external surface image data of the object. To determine whether the user performs an unauthorized behavior according to the body data and the feature data of the object, the processor is configured to: when the length of time that the distance between the mouth and the object is within a distance threshold reaches a preset length, and the external surface image of the object does not match a default external surface image, determine that the user performs an unauthorized behavior.

In some embodiments, the body data includes limb behavior data of the user; and the feature data includes vibration data of the object. To determine whether the user performs an unauthorized behavior according to the body data and the feature data of the object is recognized, the processor is configured to: when the limb behavior data of the user matches a preset limb movement pattern and the object vibrates, determine that the user performs an unauthorized behavior. In some embodiments, the vibration data is obtained by a sensor placed on the object.

In some embodiments, by executing the machine-executable instruction for recognizing an unauthorized behavior in an unattended scene stored in the memory, the processor is further configured to: when the user performs an unauthorized behavior, inflict a credit penalty on the user.

In some embodiments, by executing the machine-executable instruction for recognizing an unauthorized behavior in an unattended scene stored in the memory, the processor is further configured to: if the user performs an unauthorized behavior, report the unauthorized behavior in the unattended scene.

In some other embodiments, by executing the machine-executable instruction for recognizing an unauthorized behavior in an unattended scene stored in the memory, the processor is further configured to: if the user performs an unauthorized behavior, add an amount of resources corresponding to the object to the user's bill.

Corresponding to the above-described embodiments of the method for recognizing an unauthorized behavior in an unattended scene, this specification further provides a computer-readable storage medium. The computer-readable storage medium stores a computer program, which is executed by a processor to perform the following steps: obtain body data of a user in an unattended scene; obtain feature data of an object in the unattended scene; and determine whether the user performs an unauthorized behavior according to the body data and the feature data of the object.

In some embodiments, the body data includes mouth position data of the user; and the feature data includes object position data of the object. Determining whether the user performs an unauthorized behavior according to the body data and the feature data of the object includes: calculating the distance between the user's mouth and the object according to the mouth position data and the object position data; and when the length of time that the distance between the mouth and the object is within a distance threshold reaches a preset length, determining that the user performs an unauthorized behavior.

In some embodiments, the body data further includes mouth behavior data of the user. Determining whether the user performs an unauthorized behavior according to the body data and the feature data of the object includes: when the length of time that the distance between the mouth and the object is within a distance threshold reaches a preset length and the mouth behavior data of the user matches a preset mouth movement pattern, determining that the user performs an unauthorized behavior.

In some embodiments, the feature data further includes attribute category data of the object. Determining whether the user performs an unauthorized behavior according to the body data and the feature data of the object includes: when the length of time that the distance between the mouth and the object is within a distance threshold reaches a preset length and the attribute category of the object falls in an edible category, determining that the user performs an unauthorized behavior.

In some embodiments, the feature data further includes external surface image data of the object. Determining whether the user performs an unauthorized behavior according to the body data and the feature data of the object includes: when the length of time that the distance between the mouth and the object is within a distance threshold reaches a preset length, and the external surface image of the object does not match a default external surface image, determining that the user performs an unauthorized behavior.

In some embodiments, the body data includes limb data of the user; and the feature data includes vibration data of the object. Determining whether the user performs an unauthorized behavior according to the body data and the feature data of the object includes: when the limb behavior data of the user matches a preset limb movement pattern and the object vibrates, determining that the user performs an unauthorized behavior. In some embodiments, the vibration data is obtained by a sensor placed on the object.

In some embodiments, the processor may further perform: when the user performs an unauthorized behavior, inflicting a credit penalty on the user. In some other embodiments, the processor may further perform: if the user performs an unauthorized behavior, reporting the unauthorized behavior in the unattended scene. In still other embodiments, the processor may further perform: if the user performs an unauthorized behavior, add an amount of resources corresponding to the object to the user's bill.

The embodiments of this specification are described above. Other embodiments are within the scope of the attached claims. In some cases, actions or steps in the claims may be performed in a sequence different from that in the embodiments and the desired result can still be achieved. In addition, the desired result can still be achieved if the processes described in the drawings are not necessarily performed in the illustrated particular or continuous sequence. In some implementations, multitasking and parallel processing are also feasible or may be advantageous.

The above embodiments are only preferred embodiments of this specification and are not intended to limit this specification. Any modification, equivalent replacement, or improvement made within the spirit and principles of this specification shall fall within the scope of this specification.

The invention claimed is:

1. A method for recognizing an unauthorized eating or drinking behavior, comprising:
   obtaining, through machine vision, body movement pattern data of a user;
   obtaining mouth position data of the user;
   obtaining feature data of an object, the feature data comprising:
     position data of the object based on a radio frequency identification tag on the object,
     attribute category data of the object, and
     external surface image data of the object;
   comparing the body movement pattern data with a preset body movement pattern; and
   determining that the user's behavior is unauthorized eating or drinking in response to the body movement pattern data matching the preset body movement pattern and that:
     a distance between the user's mouth and the object is within a distance threshold over a preset length of time,
     the attribute category of the object is an edible category, and
     the external surface image data does not match a default external surface image of the object.

2. The method according to claim 1, wherein
   the body movement pattern data comprises mouth behavior data of the user; and
   the preset body movement pattern comprises a preset mouth movement pattern.

3. The method according to claim 1, wherein the determining that the user's behavior is unauthorized comprises:
   when the preset category is an edible category, determining that the user performs the unauthorized behavior.

4. The method according to claim 1, wherein
   the body movement pattern data comprises limb behavior data of the user;
   the preset body movement pattern comprises a preset limb movement pattern;
   the feature data further comprises vibration data of the object, wherein the vibration data is obtained with a sensor on the object; and
   the determining that the user's behavior is unauthorized in response to the body movement pattern data matching the preset body movement pattern comprises:
   determining a vibration state of the object based on the vibration data; and when the limb behavior data matches the preset limb movement pattern and the object vibrates, determining that the user performs the unauthorized behavior.

5. The method according to claim 1, wherein the obtaining feature data of an object includes obtaining the feature data through machine vision.

6. A method for recognizing an unauthorized eating or drinking behavior, comprising:
   obtaining, through machine vision, body data of a user, wherein the body movement pattern data includes mouth position data of the user;
   obtaining feature data of an object, wherein the feature data comprises object position data of the object and attribute category data of the object;
   comparing the body data with a preset body movement pattern; and
   in response to the body data matching the preset body movement pattern and the feature data meeting preset conditions, determining the unauthorized eating or drinking behavior of the user based on the body data and the feature data by:
     determining the attribute category of the object is an edible category, calculating a distance between the user's mouth and the object according to the mouth position data and the object position data, and determining a length of time that the distance between the mouth and the object is within a distance threshold.

7. The method according to claim 6, wherein the object position data is obtained with a radio frequency identification tag.

8. The method according to claim 7, wherein the determining the unauthorized behavior of the user comprises:

when the length of time reaches a preset length of time, determining that the user performs the unauthorized behavior.

9. The method according to claim 7, wherein the body data further comprises mouth behavior data of the user;

the preset body movement pattern comprises a preset mouth movement pattern; and the determining the unauthorized behavior of the user comprises:

when the length of time reaches a preset length of time and the mouth behavior data matches the preset mouth movement pattern, determining that the user performs the unauthorized behavior.

10. The method according to claim 7, wherein:

the determining the unauthorized behavior of the user comprises:

when the length of time reaches a preset length of time, determining that the user performs the unauthorized behavior.

11. The method according to claim 7, wherein the feature data further comprises external surface image data of the object;

the preset conditions include the external surface image data does not match a default external surface image; and the determining the unauthorized behavior of the user comprises:

when the length of time reaches a preset length of time, determining that the user performs the unauthorized behavior.

12. The method according to claim 6, wherein the body data comprises limb behavior data of the user;

the preset body movement pattern comprises a preset limb movement pattern;

the feature data comprises vibration data of the object, wherein the vibration data is obtained with a sensor on the object; and the preset conditions include that the object vibrates.

13. A method for recognizing an unauthorized behavior, comprising:

obtaining body data of a user, wherein the body data comprises mouth position data of the user;

obtaining feature data of an object, wherein the feature data comprises object position data of the object and attribute category data of the object; and determining, according to a behavior recognition model trained with results of recognizing unauthorized behaviors, the unauthorized eating or drinking behavior of the user based on the body data, the feature data, and preset body movement patterns, by:

determining the attribute category of the object is an edible category, calculating a distance between the user's mouth and the object according to the mouth position data and the object position data, and determining a length of time that the distance between the mouth and the object is within a distance threshold.

14. The method according to claim 13, wherein the object position data is obtained with a radio frequency identification tag.

15. The method according to claim 14, wherein the determining the unauthorized behavior of the user comprises:

when the length of time reaches a preset length of time, determining that the user performs the unauthorized behavior.

16. The method according to claim 14, wherein the determining the unauthorized behavior of the user comprises:

when the length of time reaches a preset length of time and the mouth behavior data matches the preset mouth movement pattern, determining that the user performs the unauthorized behavior.

17. The method according to claim 14, wherein the feature data further comprises external surface image data of the object; and the determining the unauthorized behavior of the user comprises;

when the length of time reaches a preset length of time and the external surface image data does not match a default external surface image, determining that the user performs the unauthorized behavior.

18. The method according to claim 14, wherein the determining the unauthorized behavior of the user comprises:

when the length of time reaches a predetermined length of time, determining that the user performs the unauthorized behavior.

19. The method according to claim 14, wherein the body data comprises limb behavior data of the user;

the preset body movement pattern comprises a preset limb movement pattern;

the feature data comprises vibration data of the object, wherein the vibration data is obtained with a sensor on the object; and the determining the unauthorized behavior of the user comprises:

determining a vibration state of the object based on the vibration data; and when the limb behavior data matches the preset limb movement pattern and the object vibrates, determining that the user performs the unauthorized behavior.

* * * * *